(12) United States Patent
Gervais et al.

(10) Patent No.: US 10,159,177 B2
(45) Date of Patent: Dec. 25, 2018

(54) FLOW CONTROL SYSTEM FOR AN AGRICULTURAL PRODUCT APPLICATION SYSTEM

(71) Applicant: CNH Industrial Canada, Ltd., Saskatoon (CA)

(72) Inventors: Joel John Octave Gervais, Saskatoon (CA); Rex LeRoy Ruppert, Benson, MN (US); Martin J. Roberge, Saskatoon (CA); Joël Jean-Claude Denis, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 58 days.

(21) Appl. No.: 15/234,819

(22) Filed: Aug. 11, 2016

(65) Prior Publication Data

US 2018/0042172 A1 Feb. 15, 2018

(51) Int. Cl.
*A01C 21/00* (2006.01)
*A01C 15/04* (2006.01)
*A01C 15/12* (2006.01)

(52) U.S. Cl.
CPC ............ *A01C 21/005* (2013.01); *A01C 15/04* (2013.01); *A01C 15/122* (2013.01); *A01C 15/124* (2013.01)

(58) Field of Classification Search
None
See application file for complete search history.

(56) References Cited

U.S. PATENT DOCUMENTS

| | | | | |
|---|---|---|---|---|
| 4,793,742 A | 12/1988 | Strand | | |
| 5,772,114 A | 6/1998 | Hunter | | |
| 5,913,915 A | * 6/1999 | McQuinn | ............. | A01B 79/005 700/231 |
| 5,915,313 A | * 6/1999 | Bender | ............... | A01B 79/005 111/178 |
| 5,974,348 A | * 10/1999 | Rocks | ...................... | G01S 1/70 348/120 |
| 6,058,351 A | * 5/2000 | McCauley | ............... | G06N 3/02 702/5 |

(Continued)

OTHER PUBLICATIONS

Hest, David, "N savings by the row"; Farm Industry News 41.9; Oct. 1, 2008.

(Continued)

*Primary Examiner* — Rami Khatib
(74) *Attorney, Agent, or Firm* — Rebecca L. Henkel; Rickard K. DeMille (57) ABSTRACT

An agricultural product application system for an agricultural vehicle includes a belt, a drive roll, and a flow control system, wherein the flow control system includes a gates and actuators, each gate controls a respective flow of the agricultural product to a respective output of the agricultural product application system based at least in part on a position of the gate relative to the belt, and each actuator is coupled to at least one respective gate to control the position of the at least one respective gate relative to the belt. The agricultural product application system also includes a controller that instructs each actuator to control the position of the at least one respective gate relative to the belt based at least in part on a speed of the agricultural vehicle, a turning radius of the agricultural vehicle, a prescription map, a field map, or a combination thereof.

20 Claims, 8 Drawing Sheets

(56) References Cited

U.S. PATENT DOCUMENTS

| | | | |
|---|---|---|---|
| 6,070,539 A * | 6/2000 | Flamme | A01B 79/005 111/177 |
| 6,091,997 A * | 7/2000 | Flamme | A01B 79/005 111/903 |
| 6,119,069 A * | 9/2000 | McCauley | G06K 9/48 702/5 |
| 6,520,100 B1 * | 2/2003 | Spooner, Sr. | A01C 7/102 111/52 |
| 7,311,004 B2 | 12/2007 | Giles | |
| 7,690,440 B2 | 4/2010 | Dean et al. | |
| 7,717,048 B2 * | 5/2010 | Peterson, Jr. | A01C 7/046 111/185 |
| 7,726,251 B1 * | 6/2010 | Peterson | A01C 7/046 111/185 |
| 7,861,946 B2 | 1/2011 | Beeren | |
| 7,975,981 B2 | 7/2011 | Harrison, Jr. | |
| 8,078,367 B2 * | 12/2011 | Sauder | A01B 79/005 111/200 |
| 8,109,448 B2 | 2/2012 | Giles | |
| 8,347,797 B1 * | 1/2013 | Clay | A01C 7/02 111/92 |
| 8,386,137 B2 * | 2/2013 | Sauder | A01B 79/005 111/200 |
| 8,418,636 B2 * | 4/2013 | Liu | A01C 7/105 111/200 |
| 8,863,676 B2 * | 10/2014 | Brockmann | A01C 7/088 111/186 |
| 9,237,687 B2 * | 1/2016 | Sauder | A01C 5/064 |
| 9,661,837 B2 * | 5/2017 | Bastin | A01M 1/20 |
| 2002/0043197 A1 * | 4/2002 | Schaffert | A01C 5/062 111/120 |
| 2005/0098216 A1 * | 5/2005 | Bodie | F16K 15/026 137/540 |
| 2005/0103244 A1 * | 5/2005 | Mayerle | A01C 7/06 111/175 |
| 2006/0282228 A1 * | 12/2006 | Avey | A01B 79/005 702/81 |
| 2007/0266917 A1 * | 11/2007 | Riewerts | A01C 7/046 111/200 |
| 2008/0047475 A1 * | 2/2008 | Stehling | A01C 7/208 111/69 |
| 2008/0230624 A1 | 9/2008 | Giles et al. | |
| 2009/0090284 A1 * | 4/2009 | Peterson, Jr. | A01C 7/046 111/185 |
| 2009/0118910 A1 * | 5/2009 | Carr | A01B 79/005 701/50 |
| 2010/0043685 A1 * | 2/2010 | Gogerty | A01C 7/04 111/200 |
| 2010/0211267 A1 * | 8/2010 | Shimazaki | B60R 1/00 701/42 |
| 2010/0282141 A1 * | 11/2010 | Wollenhaupt | A01C 7/06 111/118 |
| 2010/0282147 A1 * | 11/2010 | Wollenhaupt | A01C 7/06 111/200 |
| 2010/0313800 A1 * | 12/2010 | Anderson | A01C 7/082 111/130 |
| 2011/0054743 A1 * | 3/2011 | Kocer | A01B 79/005 701/50 |
| 2011/0178632 A1 * | 7/2011 | Straeter | A01C 7/10 700/219 |
| 2011/0270529 A1 * | 11/2011 | Macy | A01C 21/00 702/19 |
| 2011/0313572 A1 * | 12/2011 | Kowalchuk | A01C 7/205 700/275 |
| 2012/0046838 A1 * | 2/2012 | Landphair | A01B 79/005 701/50 |
| 2012/0048161 A1 * | 3/2012 | Shoup | A01C 7/046 111/174 |
| 2012/0067260 A1 * | 3/2012 | Garner | A01C 7/042 111/171 |
| 2012/0111247 A1 * | 5/2012 | Garner | A01C 7/042 111/171 |
| 2012/0215410 A1 * | 8/2012 | McClure | A01B 79/005 701/50 |
| 2012/0227647 A1 * | 9/2012 | Gelinske | G01F 1/666 111/174 |
| 2012/0228395 A1 | 9/2012 | Needham et al. | |
| 2012/0234934 A1 * | 9/2012 | Score | E01C 19/203 239/7 |
| 2013/0092065 A1 * | 4/2013 | Wollenhaupt | A01C 7/06 111/118 |
| 2013/0112125 A1 * | 5/2013 | Wollenhaupt | A01C 7/06 111/174 |
| 2013/0153676 A1 | 6/2013 | Ballu | |
| 2013/0174040 A1 * | 7/2013 | Johnson | G06Q 10/06 715/733 |
| 2013/0234057 A1 | 9/2013 | Muller | |
| 2014/0014013 A1 * | 1/2014 | Brockmann | A01C 7/088 111/186 |
| 2014/0048002 A1 * | 2/2014 | Grimm | A01C 7/06 111/127 |
| 2014/0090585 A1 * | 4/2014 | Sauder | A01C 5/064 111/121 |
| 2014/0116306 A1 * | 5/2014 | Sharp | A01C 7/127 111/163 |
| 2014/0158031 A1 * | 6/2014 | Hagny | A01C 5/06 111/121 |
| 2014/0263705 A1 | 9/2014 | Michael et al. | |
| 2014/0277959 A1 * | 9/2014 | Wagers | A01C 21/005 701/50 |
| 2014/0297242 A1 * | 10/2014 | Sauder | A01C 21/005 703/6 |
| 2014/0361094 A1 | 12/2014 | Michael | |
| 2015/0006212 A1 * | 1/2015 | Covely | A01G 1/001 705/7.13 |
| 2015/0105984 A1 * | 4/2015 | Birrell | A01D 41/127 701/50 |
| 2015/0134210 A1 * | 5/2015 | Steffen | A01C 21/005 701/50 |
| 2015/0144042 A1 * | 5/2015 | Sheppard | A01C 7/06 111/186 |
| 2015/0237794 A1 * | 8/2015 | Sauder | A01C 5/064 111/174 |
| 2015/0289441 A1 * | 10/2015 | Arnett | A01C 7/046 111/185 |
| 2015/0351314 A1 * | 12/2015 | Sauder | A01C 7/046 700/275 |
| 2015/0351315 A1 * | 12/2015 | Wendte | A01C 21/005 111/183 |
| 2016/0037713 A1 * | 2/2016 | Wendte | A01C 21/005 111/177 |
| 2016/0050842 A1 * | 2/2016 | Sauder | A01C 7/046 111/186 |
| 2016/0165794 A1 * | 6/2016 | Czapka | A01C 21/005 111/185 |
| 2016/0234996 A1 * | 8/2016 | Sauder | A01C 21/005 |
| 2016/0302353 A1 * | 10/2016 | Wendte | A01C 21/005 |

OTHER PUBLICATIONS

Grisso, Bobby et al., "Precision Farming Tools: Variable-Rate Application"; Virginia Cooperative Extension, Publication 442-505, 2011.

"AE 50 salute to the winners"; Engineering & Technology for a Sustainable World 19.1; Jan. 2012.

Field-IQ Crop Input Control System, Sitech West, Jan. 15, 2016.

* cited by examiner

FLOW CONTROL SYSTEM FOR AN AGRICULTURAL PRODUCT APPLICATION SYSTEM

BACKGROUND

The present disclosure relates generally to air-assisted agricultural product application equipment. In particular, the present disclosure relates to a flow control system for an agricultural product application system using sectional control.

Agricultural product application equipment may traverse a field in a pattern (e.g., rows or columns) while applying agricultural product. However, the agricultural product application equipment may apply product in insufficient or excessive quantities (e.g., via overlap) due to its travel pattern and the field layout. Moreover, when turning (e.g., at the end of a current row and the beginning of a next row), the agricultural product application equipment may apply excessive agricultural product near the axis of rotation and/or insufficient agricultural product away from the axis of rotation.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, an agricultural product application system for an agricultural vehicle includes a belt configured to convey agricultural product, a drive roll configured to drive the belt, and a flow control system configured to receive the agricultural product from the belt, wherein the flow control system includes a plurality of gates and a plurality of actuators, each gate of the plurality of gates is configured to control a respective flow of the agricultural product to at least one respective output of the agricultural product application system based at least in part on a position of the gate relative to the belt, and each actuator of the plurality of actuators is coupled to at least one respective gate of the plurality of gates to control the position of the at least one respective gate relative to the belt. The agricultural product application system also includes a controller communicatively coupled to the plurality of actuators, wherein the controller is configured to instruct each actuator of the plurality of actuators to control the position of the at least one respective gate relative to the belt based at least in part on a speed of the agricultural vehicle, a turning radius of the agricultural vehicle, a prescription map, a field map, or a combination thereof.

In a second embodiment, an agricultural product application vehicle includes a left boom and a right boom. The agricultural product application vehicle also includes an agricultural product application system that includes a first plurality of outputs coupled to the left boom, a second plurality of outputs coupled to the right boom, a left agricultural product application assembly, and a right agricultural product application assembly, wherein each output of the first and second plurality of outputs is configured to spread agricultural product onto a soil surface, the left agricultural product application assembly is configured to distribute the agricultural product to the first plurality of outputs, the right agricultural product application assembly is configured to distribute the agricultural product to the second plurality of outputs. The left agricultural product application assembly and the right agricultural product assembly each includes a belt configured to convey the agricultural product, a drive roll configured to drive the belt, and a flow control system that includes a plurality of gates and a plurality of actuators, wherein each gate of the plurality of gates is configured to control a respective flow of the agricultural product to at least one respective output of a respective plurality of outputs based at least in part on a position of the gate relative to the belt, and each actuator of the plurality of actuators is coupled to at least one respective gate of the plurality of gates to control the position of the at least one respective gate relative to the belt. The agricultural product application vehicle also includes a controller communicatively coupled to the plurality of actuators of the left agricultural product application assembly, to the drive roll of the left agricultural product application assembly, to the plurality of actuators of the right agricultural product application assembly; and to the drive roll of the right agricultural product application assembly. The controller is configured to instruct each actuator of the plurality of actuators of the left agricultural product application assembly to control the position of the at least one respective gate relative to the belt of the left agricultural product application assembly based at least in part on a speed of the agricultural product application vehicle, a turning radius of the agricultural product application vehicle, a prescription map, a field map, or a combination thereof. The controller is also configured to instruct each actuator of the plurality of actuators of the right agricultural product application assembly to control the position of the at least one respective gate relative to the belt of the right agricultural product application assembly based at least in part on the speed of the agricultural product application vehicle, the turning radius of the agricultural product application vehicle, the prescription map, the field map, or the combination thereof.

In a third embodiment, a method for controlling an agricultural product application system of an agricultural product application vehicle includes determining, via a processor, a speed of the agricultural product application vehicle, a turn radius of the agricultural product application vehicle, or a combination thereof. The method also includes controlling, via the processor, a first set of actuators of a first flow control system of a first agricultural product application assembly, a second set of actuators of a second flow control system of a second agricultural product application assembly, or a combination thereof, based at least in part on the speed of the agricultural product application vehicle, the turn radius of the agricultural product application vehicle, a prescription map, a field map, or a combination thereof. The first set of actuators is coupled a first set of gates of the first flow control system and controls positions of respective gates of the first set of gates relative to a first belt of the first agricultural product application assembly. The second set of actuators is coupled a second set of gates of the second flow control system and controls positions of respective gates of the second set of gates relative to a second belt of the second agricultural product application assembly.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to improving agricultural product distribution on a field. In particular, the present disclosure relates to improving agricultural product application equipment by enabling sectional control and compensating for agricultural product flow variations during a turn. The agricultural product application equipment may use a turning compensating system linked to product rate of each individual delivery nozzle of the agricultural product application equipment. As such, the agricultural product application equipment may compensate for agricultural product flow variations during a turn and apply product in approximately uniform quantities. Accordingly, systems and methods are disclosed in which an agricultural product application system of the agricultural product application equipment includes a flow control system having actuators and gates to control flow to nozzles of the agricultural product application equipment, thereby facilitating sectional control and compensating for product flow variations during a turn. In particular, one embodiment of the present disclosure includes an agricultural product application system for an agricultural vehicle that includes a belt configured to convey agricultural product, a drive roll configured to drive the belt, and a flow control system configured to receive the agricultural product from the belt, wherein the flow control system includes a plurality of gates and a plurality of actuators, each gate of the plurality of gates is configured to control a respective flow of the agricultural product to at least one respective output of the agricultural product application system based at least in part on a position of the gate relative to the belt, and each actuator of the plurality of actuators is coupled to at least one respective gate of the plurality of gates to control the position of the at least one respective gate relative to the belt. The agricultural product application system also includes a controller communicatively coupled to the plurality of actuators, wherein the controller is configured to instruct each actuator of the plurality of actuators to control the position of the at least one respective gate relative to the belt based at least in part on a speed of the agricultural vehicle, a turning radius of the agricultural vehicle, a prescription map, a field map, or a combination thereof.

Figure 1:
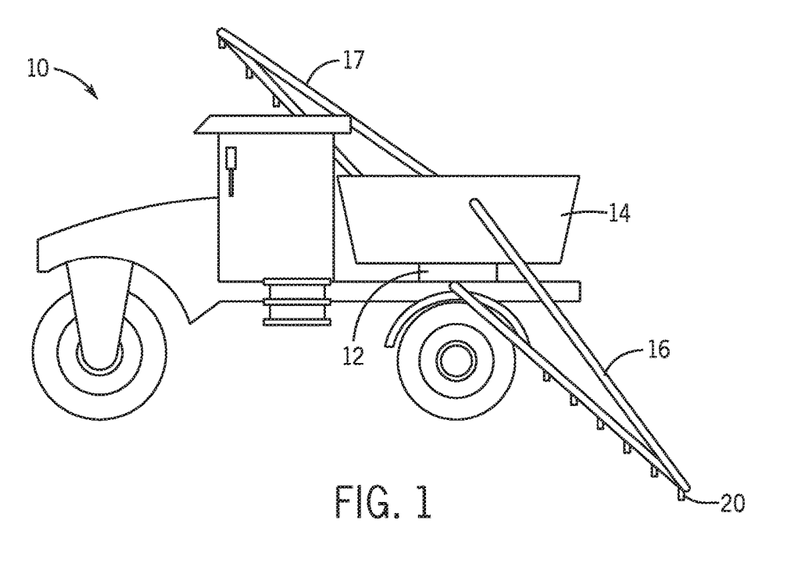
FIG. 1 is a perspective view of an agricultural product application equipment, in accordance with an embodiment of the present disclosure.

FIG. 1 is a perspective view of a self-propelled agricultural product application equipment 10, including an agricultural product application system 12, in accordance with an embodiment of the present disclosure. The agricultural product application equipment 10 includes a main tank 14 that may store agricultural product. The agricultural product may include seeds, fertilizer, or any other suitable agricultural product. The agricultural product flows from the main tank 14 to the agricultural product application system 12. In some embodiments, a feeding auger may be used to transport the agricultural product from the main tank 14 to the agricultural product application system 12. The agricultural product application system 12 may apportion and direct the agricultural product to outputs (e.g., nozzles or applicators 20) such that a desired amount of agricultural product is spread onto the ground. The agricultural product is transported in pipes disposed in a left wing or boom 16 and a right wing or boom 17 of the agricultural product application equipment 10 to the nozzles or applicators 20. It should be noted that the outputs may be any suitable device to apply, spread, and/or distribute the agricultural product on the ground, such as the nozzles or applicators 20.

The agricultural product application equipment 10 may traverse a field in a pattern (e.g., rows or columns) while applying agricultural product for efficiency. However, the agricultural product application equipment 10 may apply agricultural product in insufficient (e.g., via a void that is not fertilized) or excessive quantities (e.g., via overlap) due to its travel pattern and the field layout. For example, when turning (e.g., at the end of a current row and the beginning of a next row), the agricultural product application equipment 10 may apply excessive agricultural product near the axis of rotation and/or insufficient agricultural product away from the axis of rotation. Present embodiments disclose systems for controlling the flow to each nozzle 20 during travel, including turning, such that the agricultural product application equipment 10 may apply agricultural product approximately evenly onto the ground.

Figure 2:
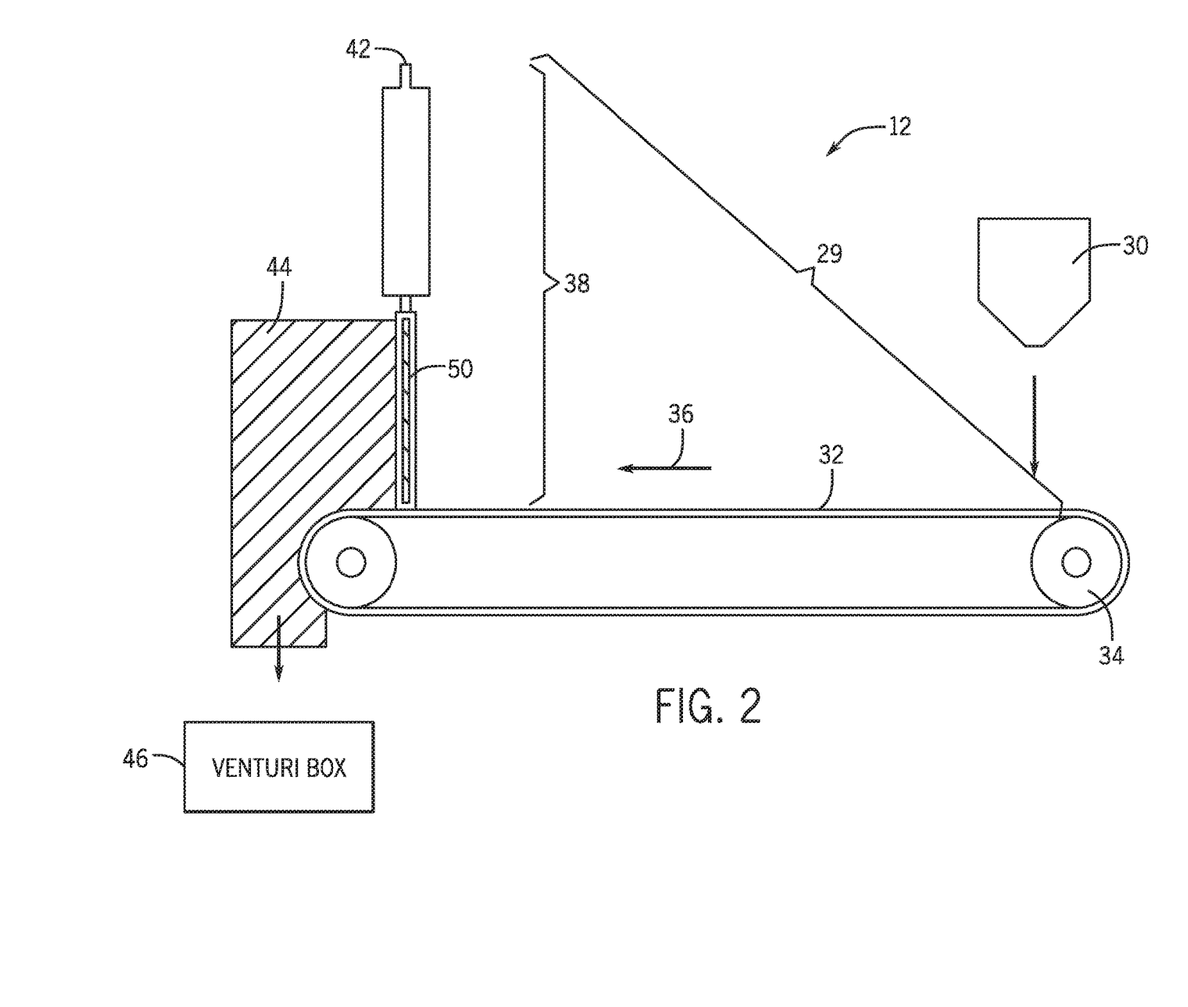
FIG. 2 is a schematic side view of an agricultural product application system that may be employed within the agricultural product application equipment of FIG. 1, in accordance with an embodiment of the present disclosure.

FIG. 2 is a schematic side view of an agricultural product application system 12 that may be employed within the agricultural product application equipment of FIG. 1, in accordance with an embodiment of the present disclosure. The agricultural product application system 12 may include an accumulation zone 30 that receives agricultural product from the main tank (e.g., via a feeding auger). When flow of agricultural product is desired, the accumulation zone 30 transports the agricultural product to one or more agricultural product application assemblies 29, and more specifically to a respective belt 32 of the one or more agricultural product application assemblies 29 (e.g., via a gravity feed). In some embodiments, each agricultural product application assembly 29 corresponds to a boom of the agricultural product application equipment. As such, the agricultural product application equipment may include a left agricultural product application assembly 29 that corresponds to and apportions and distributes agricultural product to the left boom, and a right agricultural product application assembly 29 that corresponds to and apportions and distributes agricultural product to the right boom. The belt is powered or driven by one or more powered drive rolls 34 (e.g., hydraulic drive roll(s), electric drive roll(s), etc.). The drive roll(s) 34 are configured to rotate such that the belt 32 conveys the agricultural product in a direction 36 toward a flow control system 38 of the respective agricultural product application assembly 29. The flow control system 38 may include gates 50 that span the width of the belt 32 and are separated by corresponding gate guides. The flow control system 38 may include at least one gate guide, wherein each gate 50 of the plurality of gates is supported by the at least one gate guide. The gates 50 may be oriented approximately perpendicularly to the direction of travel 36 of the belt 32. The gates 50 may be controlled by actuators 42 of the flow control system 38, such that each gate 50 may be set to a desired (e.g., between 0 and 50 mm, 0 and 2 inches, etc.) above the belt 32 by a respective actuator 42. The actuators 42 may be operated by any suitable source of energy, such as electric current, hydraulic fluid pressure, pneumatic pressure, or the like. The closer (e.g., lower) a gate 50 is to the belt 32, the less agricultural product may pass through dividers 44. Each divider 44 may be disposed between a pair of gates 50 of the plurality of gates 50, wherein the divider 44 is configured to separate or maintain separation of respective flows of the agricultural product. In some embodiments, an additional set of dividers may be included before the agricultural product reaches the gates 50 to separate the agricultural product into streams upstream of the gates 50. For example, the additional set of dividers may line up with the gate guides. As such, the dividers 44 may be positioned upstream of the pair of gates 50, downstream of the pair of gates 50, or a combination thereof, relative to a direction of the respective flows of the agricultural product. By adjusting the position of each gate 50 with a respective actuator 42, the amount of agricultural product passing through each gate 50 may be controlled. Each gate 50 is disposed between a respective pair of gate guides. The gate 50 may move freely and vertically within the surrounding gate guides. The gate guides may stabilize the gate 50 throughout the range of the motion of the gate 50 and support the gate 50 against pressure resulting from the flow of the agricultural product.

Once the agricultural product passes through the gates 50, separation of the resulting streams of agricultural product is maintained with the dividers 44. The separated streams of agricultural product are directed to a venturi box 46, which may contain dividers to maintain the separated streams. The venturi box 46 then fluidizes, accelerates, and distributes the agricultural product among the pipes of the booms via a pneumatic flow. The pipes, disposed in a left boom and a right boom of the agricultural product application equipment, transport the agricultural product to the nozzles or applicators of the agricultural product application equipment. Each gate 50 may correspond to one or more nozzles. For example, each gate may correspond to one nozzle, two nozzles, four nozzles, etc.

FIG. 3 is a schematic front view of the flow control system 38 of the agricultural product application system 12 of FIG. 2, in accordance with an embodiment of the present disclosure. Because the agricultural product application system may include left and right agricultural product application assemblies, the agricultural product application equipment may also include respective "left" and "right" flow control systems 38 (wherein the left flow control system 38 is the flow control system 38 of the left agricultural product application assembly, and the right flow control system 38 is the flow control system 38 of the right agricultural product application assembly). The schematic front view of the flow control system 38 illustrates the configuration of the gates 50, the gate guides 51, and the actuators 42. Each gate 50 is controlled by a respective actuator 42, such that the gate 50 may be set to a desired height above the belt 32. The embodiment shown in FIG. 3 includes one actuator 42 for controlling each gate 50. In some embodiments, one actuator 42 may control more than one gate 50. For example, each actuator 42 may control two, three, four, or more gates 50. The distance 52 between each gate 50 and the belt 32 controls the amount of agricultural product that passes through to the dividers 44 and ultimately to the nozzles or applicators of the booms of the agricultural product application equipment. The gates 50 may be supported and maintained in an orientation perpendicular to the direction of travel of the belt 32 by the gate guides 51.

FIG. 4 is a block diagram of agricultural product application equipment 10 of FIG. 1, in accordance with an embodiment of the present disclosure. The agricultural product application equipment 10 includes a controller 62 that may output and receive signals to control components of the agricultural product application system. The controller 62 is communicatively coupled to sensor(s) 64 of the agricultural product application equipment and configured to receive input from the sensor(s) 64. For example, the controller 62 may receive signals from the sensor(s) 64 indicative of vehicle speed, vehicle acceleration, vehicle location, spatial location, vehicle orientation, vehicle direction, vehicle steering angle, or a combination thereof, among other parameters. The controller 62 may thus receive information related to the speed and/or acceleration of the agricultural product application equipment 10, the location of the agricultural product application equipment (e.g., from a Global Positioning System (GPS) receiver, GPS antenna, Differential GPS (DGPS) receiver, DGPS antenna, or other location determination technique device), the orientation and/or direction of the agricultural product application equipment (e.g., whether the agricultural product application equipment is traveling in an approximately straight line, turning right, turning left, etc.), or a combination thereof, among other information.

Figure 4:
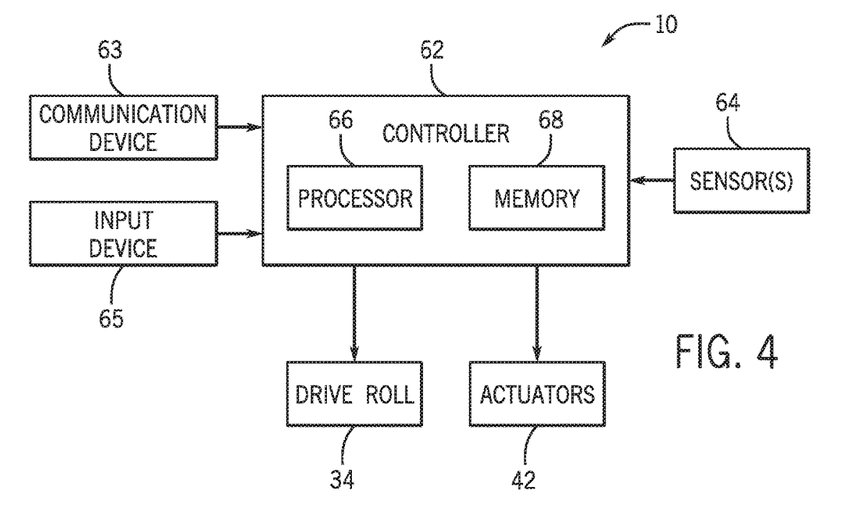
FIG. 4 is a block diagram of a control system that may control the agricultural product application equipment of FIG. 2, in accordance with an embodiment of the present disclosure.

The controller 62 is also communicatively coupled to the drive roll 34 of the respective agricultural product application assembly and the actuators 42 of the respective flow control system 38. The controller 62 may control the drive roll 34 such that the drive roll 34 drives the belt at a desired speed. In some embodiments, the controller 62 may control the drive roll 34 based at least in part on the speed of the agricultural product application equipment, a turning radius of the agricultural product application equipment, or a combination thereof. For example, as the agricultural product application equipment accelerates, the controller 62 may instruct the drive roll 34 to increase speed. In some instances, the controller 62 may instruct the drive rolls 34 of the left and right agricultural product application assemblies such that the drive rolls 34 of the left and right agricultural product application assemblies rotate at approximately the same speed. In some embodiments, the turning radius of the agricultural product application equipment may be determined at least in part by a first signal indicative of an orientation of the agricultural product application equipment and output by a vehicle orientation sensor communicatively coupled to the controller 62, a second signal indicative of a position of the agricultural product application equipment and output by a spatial locating device communicatively coupled to the controller 62, a third signal indicative of a steering angle of the agricultural product application equipment and output by a vehicle steering sensor communicatively coupled to the controller 62, or a combination thereof. As such, when the agricultural product application equipment is traveling in approximately a straight line (e.g., wherein the turning radius of the agricultural product application equipment 10 is zero), it may be desirable to instruct the drive rolls 34 of the left and right flow control system to rotate at approximately the same speed. In some instances, the controller 62 may instruct the drive rolls 34 of the left and right agricultural product application assemblies based on the turning radius of the agricultural product application equipment 10, such that the drive rolls 34 of the left and right flow agricultural product application assemblies rotate at different speeds. For example, when the agricultural product application equipment 10 executes a left turn, it may be desirable to have the drive roll 34 of the left agricultural product application assembly rotate at a slower speed than the drive roll 34 of the right agricultural product application system assembly in order to let less agricultural product through the gates of the left flow control system and spread less agricultural product from the corresponding nozzles of the left boom than the nozzles of the right boom (and vice versa for when the agricultural product application equipment 10 executes a right turn).

The controller 62 may control the actuators 42, individually or collectively, to control the amount and/or apportionment of agricultural product that enters the venturi box and is ultimately applied to the ground. For example, the controller 62 may instruct the actuators 42 to lift one or more of the gates a distance above the belt to establish a desired flow rate of agricultural product to the respective nozzles. In some embodiments, the controller 62 may control the actuators 42 based at least in part on a speed of the agricultural product application equipment 10, a turning radius of the agricultural product application equipment 10, a prescription map, a field map, or a combination thereof. A prescription map quantifies desired amounts of agricultural product for designated areas of a field. For example, when the agricultural product application equipment 10 is traveling in an approximately straight line (e.g., wherein the turning radius of the agricultural product application equipment 10 is zero), the controller 62 may instruct the actuators 42 to position all of the gates an approximately equal distance from the belt such that an approximately equal amount of agricultural product flows to and is distributed by the corresponding nozzles of the booms of the agricultural product application equipment.

The controller 62 may control the actuators 42 such that one or more gates are positioned a first distance above the belt, and the remaining gates are positioned a second distance above the belt, in which the first distance is different than the second distance. As such, when the agricultural product application equipment is turning left, the controller 62 may instruct the leftmost actuator 42 of the flow control system to position the leftmost gate closer to the belt, instruct the rightmost actuator 42 to position the rightmost gate farther above the belt, and instruct the remaining actuators 42 to position each gate in a position between the position of the leftmost gate and the rightmost gate. For example, each gate to the right of the leftmost gate may be positioned an increment above the previous (immediate left) gate. In this manner, less agricultural product may flow through the leftmost gate and be distributed by the corresponding nozzle(s), while more agricultural product may flow through the rightmost gate and be distributed by the corresponding nozzle(s), resulting in a more even distribution of agricultural product when the agricultural product application equipment turns left. When the agricultural product application equipment is turning right, the same advantage may be realized by instructing the rightmost actuator 42 to position the rightmost gate closer to the belt, instructing the leftmost actuator 42 to position the leftmost gate farther above the belt, and instructing the remaining actuators 42 to position each gate in a position between the position of the rightmost gate and the leftmost gate.

The controller 62 includes a processor 66 (e.g., a microprocessor) that may execute software, such as software for controlling the agricultural product application system. Moreover, the processor 66 may include multiple microprocessors, one or more "general-purpose" microprocessors, one or more special-purpose microprocessors, and/or one or more application specific integrated circuits (ASICS), or some combination thereof. For example, the processor 66 may include one or more reduced instruction set (RISC) processors. The processor 66 may be coupled to a memory device 68 that may store information such as control software, look up tables, configuration data, etc. In some embodiments, the processor 66 and/or the memory device 68 may be external to the controller 62. The memory device 68 may include a tangible, non-transitory, machine-readable medium, such as a volatile memory (e.g., a random access memory (RAM)) and/or a nonvolatile memory (e.g., a read-only memory (ROM)). The memory device 68 may store a variety of information and may be used for various purposes. For example, the memory device 68 may store machine-readable and/or processor-executable instructions (e.g., firmware or software) for the processor 66 to execute, such as instructions for controlling the agricultural product application system. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the agricultural product application system, etc.), and any other suitable data. In some embodiments, the memory device 68 may store instructions related to controlling the drive roll 34 and/or actuators 42 based on the vehicle speed, vehicle position, vehicle orientation, vehicle steering angle, or a combination thereof. The processor 66 may then execute the instructions to control the drive roll 34 and/or the actuators 42 to apply agricultural product as desired.

In some embodiments, the controller 62 may be controlled via a controller area network (CAN) bus protocol, such as ISOBus Class 3. ISOBus Class 3 is a vehicle bus standard that enables the controller 62 to control certain agricultural product application equipment functions, such as ground speed, rear power takeoff functions, rear hitch, and the like.

The controller 62 may be communicatively coupled to a communication device 63 that may be used to send and receive data. In some embodiments, the communication device 63 may be used to communicate with an agricultural system, a communications base station, and/or an administrative or back office system (e.g., for logistical purposes). The communication device 63 may send and receive information over a communication network, such as WiFi, a proprietary protocol, and the like. In some embodiments, the communication device 63 enables a wireless exchange of information (e.g., between the controller 62 and the base station). The communication device 63 may enable the controller 62 to send and receive information related to operation of the agricultural product application equipment. For example, the communication device 63 may enable the controller 62 to receive a broadcasting signal from the agricultural system or the base station that indicates whether the agricultural product application equipment should be operating. If the controller receives the broadcasting signal, the agricultural product application equipment may remain operating or begin operating if not currently operating. If the controller does not receive the broadcasting signal, the agricultural product application equipment may remain not operating or cease operating if currently operating.

As illustrated, the controller 62 is communicatively coupled to an input device 65. The input device may be any suitable input device that enables an operator to enter information to be received by the controller 62. For example, the user may enter an application rate for each nozzle or applicator of the agricultural product application equipment to apply the agricultural product to the field.

Figure 3:
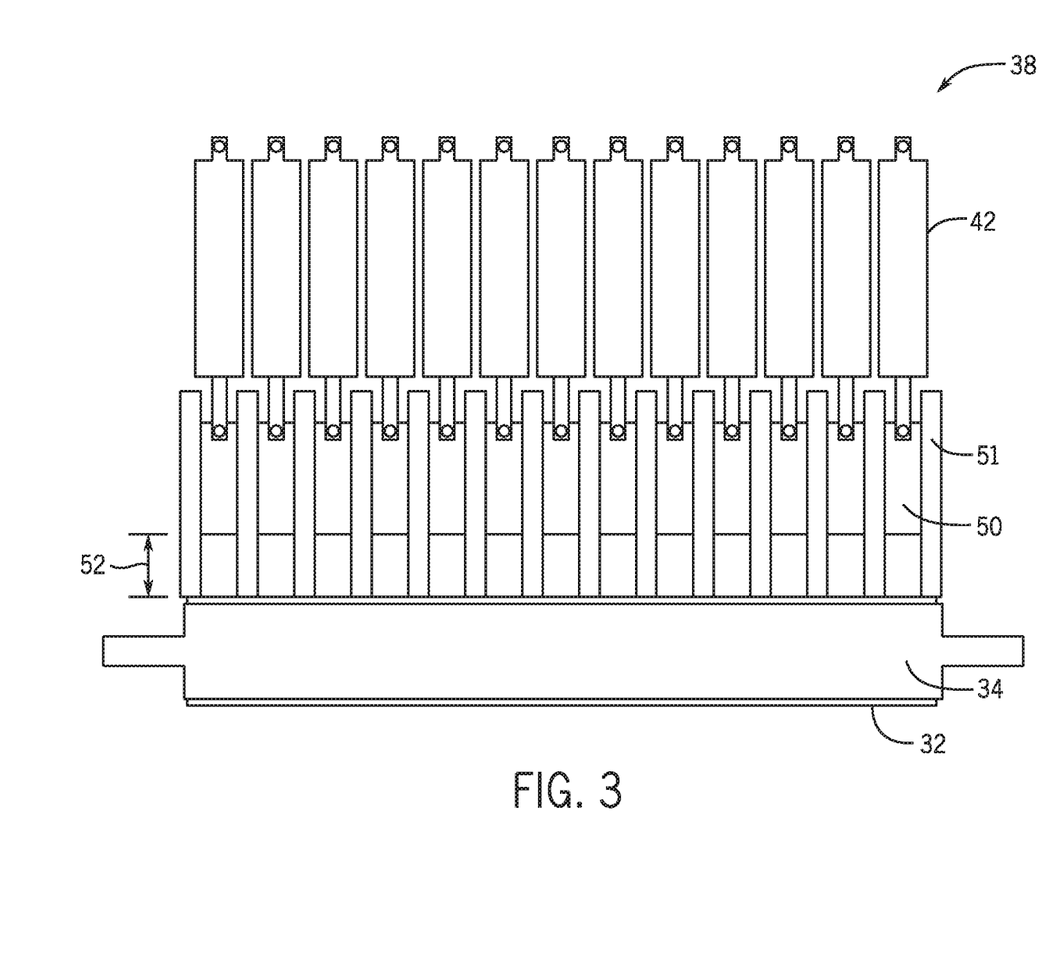
FIG. 3 is a front view of a flow control system of the agricultural product application system of FIG. 2, in accordance with an embodiment of the present disclosure.
Figure 5:
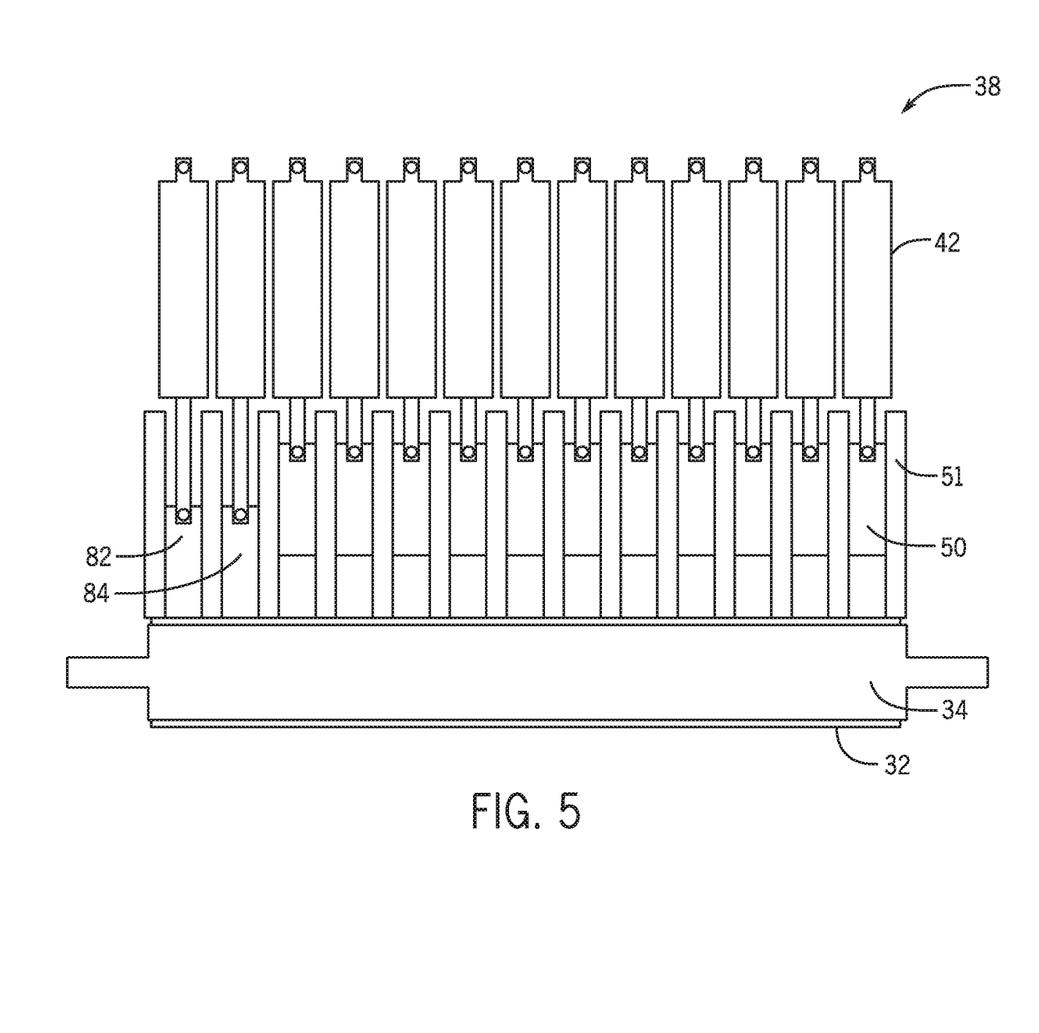
FIG. 5 is a schematic of a front view of the flow control system of FIG. 3, in which the two leftmost gates of the flow control system are closed while the remaining gates are open, in accordance with an embodiment of the present disclosure.

FIG. 5 is a schematic front view of the flow control system 38 of FIG. 3, in which the two leftmost gates 82, 84 of the flow control system 38 are closed while the remaining gates 50 are open, in accordance with an embodiment of the present disclosure. As such, agricultural product flows through the open gates 50, but not the leftmost gates 82, 84. Thus, agricultural product is applied through the nozzles 20 of FIG. 1 corresponding to the open gates 50. As such, the controller 62 may control the flow (e.g., stop the flow) of agricultural product to certain nozzles based on a geometry of a field or prescription map by instructing certain actuators 42 to close their respective gates 50 (and stop the flow of agricultural product to the corresponding nozzle(s), while instructing other actuators 42 to open their respective gate 50 (and enable the flow of agricultural product to the corresponding nozzle(s)). In some embodiments, the prescription map may be stored in the memory device 68.

Sectionally controlling the flow control system 38 in this manner may enable approximately even distribution of agricultural product on a field. For example, the agricultural product application equipment may travel row-by-row in a field, wherein an end of a row is angled, rather than perpendicular to the agricultural product application equipment's direction of travel. As another example, the agricultural product application equipment may encounter obstacles (e.g., water ways, boulders, structures, and the like) in the direction of travel, wherein the agricultural product application equipment may steer around the obstacles. In such examples, the controller 62 may sectionally control the flow control system 38 (e.g., as illustrated in FIG. 5) such that only certain portions (e.g., the two leftmost gates 82, 84) are closed so that the agricultural product is not applied, for example, more than once on a same portion of the field. In certain circumstances, the agricultural product application equipment may, in one pass, travel over and apply agricultural product to multiple rows of crop of unequal length. The controller 62 may sectionally control the flow control system 38 to close the gates of the flow control system 38 (e.g., the two leftmost gates 82, 84) that correspond to rows of crop that end as the agricultural product application equipment travels over the multiple rows of crop, while keeping the gates that correspond to rows of crops that have not ended open. In this manner, the controller 62 may avoid applying agricultural product to a portion of the field where there is no crop, reducing waste of the agricultural product.

Figure 6:
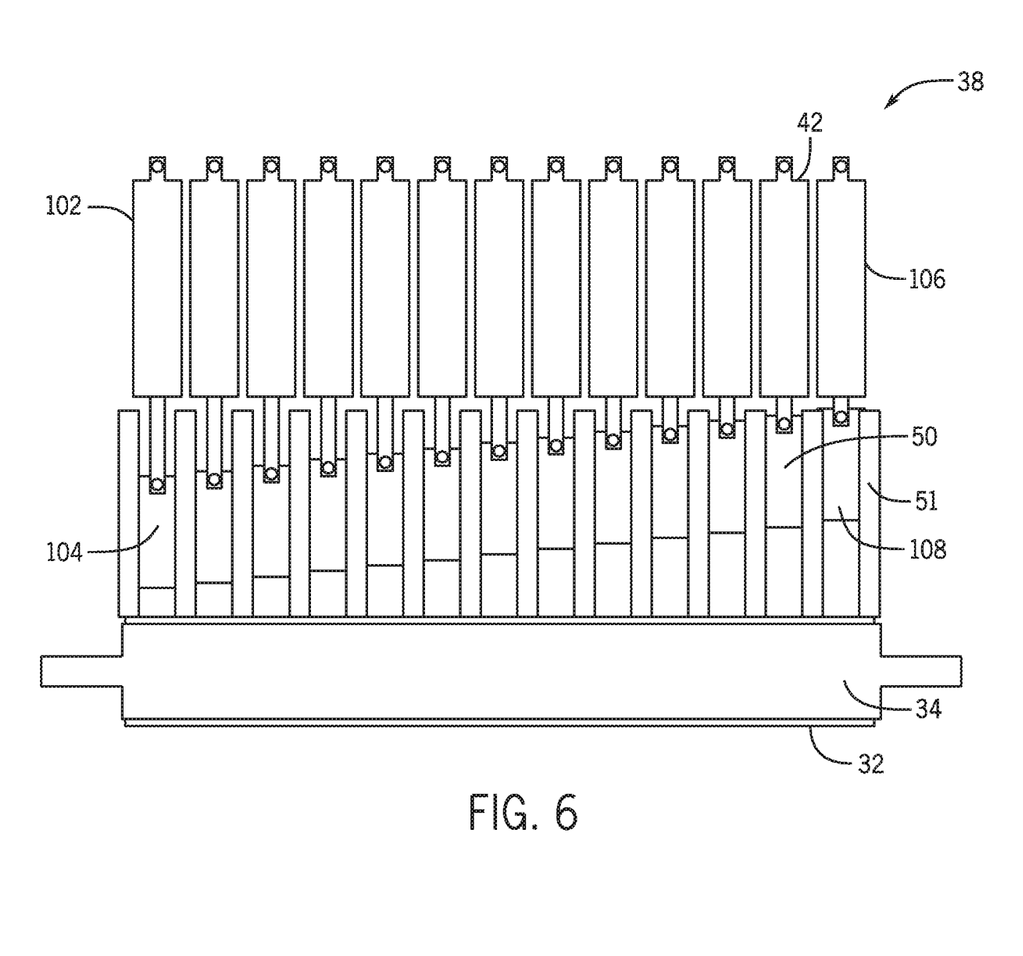
FIG. 6 is a schematic of a front view of the flow control system of FIG. 3, in which the gates of the flow control system are positioned for the agricultural product application equipment to make a left turn, in accordance with an embodiment of the present disclosure.

FIG. 6 is a schematic front view of the flow control system 38 of FIG. 3, in which the gates 50 of the flow control system are positioned for the agricultural product application equipment to make a left turn, in accordance with an embodiment of the present disclosure. Because the distal end of the left boom of the agricultural product application equipment travels a shorter distance than the proximal end of the left boom, it may be desirable to expel less agricultural product from the nozzle(s) near the distal end of the left boom than from the nozzle(s) near the proximal end of the left boom. As such, the controller may instruct the leftmost actuator 102 to position the leftmost gate 104 closer to the belt 32. The controller may also instruct the rightmost actuator 106 to position the rightmost gate 108 farther from the belt 32. In addition, the controller may instruct the remaining actuators 42 to position each gate in a position between the position of the leftmost gate 104 and the position of the rightmost gate 108. By way of example, each gate to the right of the leftmost gate 104 may be positioned an increment above the previous (immediate left) gate. For the right boom, it may be similarly desirable to expel less agricultural product from the nozzle(s) near the distal end of the right boom than from the nozzle(s) near the proximal end of the right boom. However, it may also be desirable to expel a greater or approximately equal amount of agricultural product from the nozzle(s) near the distal end of the right boom as compared to the nozzle(s) near the proximal end of the left boom.

Once the agricultural product passes through the gates 50, dividers may maintain the separated streams of agricultural product. In some instances, such as when the agricultural product application equipment is on sloped terrain, such as a hill, the dividers may ensure the streams of agricultural product remain separated, such that the agricultural product may be evenly distributed. The separated streams may be directed to a venturi box, which may fluidize and distribute the agricultural product among pipes of the booms of the agricultural product application equipment via a pneumatic flow. The pipes transport the agricultural product to the nozzles of the agricultural product application equipment, which spread the agricultural product on the ground. When turning left, the nozzles of the left end of the left boom of the agricultural product application equipment may spread less agricultural product than the nozzles of the right end of the left boom, because the leftmost gate 104 of the left flow control system 38 is closer to the belt 32 and reduces the flow of agricultural product to the corresponding nozzle(s), while spreading more agricultural product from the right end of the left boom because the rightmost gate 108 of the left flow control system 38 is farther above the belt 32 and increases the flow of agricultural product to the corresponding nozzle(s). In some embodiments, the gates of the right flow control system 38 are positioned in approximately the same positions as the gates of the left flow control system 38. To spread less agricultural product from the corresponding nozzles of the left boom than the right boom, the speed of the drive roll(s) 34 of the left agricultural product application assembly may be less than the speed of the drive roll(s) 34 of the right agricultural product application assembly. For example, when making a left turn, the speed of the drive roll(s) 34 of the left agricultural product application assembly may remain constant while the speed of the drive roll(s) 34 of the right agricultural product application assembly increases by a factor of 1.5 to 2. In some embodiments, when making a left turn, the speed of the drive roll(s) 34 of the left agricultural product application assembly may be reduced (e.g., by half), the speed of the drive roll(s) 34 of the right agricultural product application assembly may be increased (e.g., by a factor of 1.5 to 2), or both (e.g., the speed of the drive roll(s) 34 of the left agricultural product application assembly may be reduced while the speed of the drive roll(s) 34 of the right agricultural product application assembly may be increased). The change of speed of the respective drive roll(s) may be determined at least partially based on a speed of the agricultural product application equipment, the position of the gates 50 of the respective flow control system 38, the orientation and/or steering angle of the agricultural product application equipment, or a combination thereof, among other parameters. Instructions, lookup tables, and/or other data related to the change of speed of the respective drive roll(s) when making a turn may be stored in the memory device.

Figure 7:
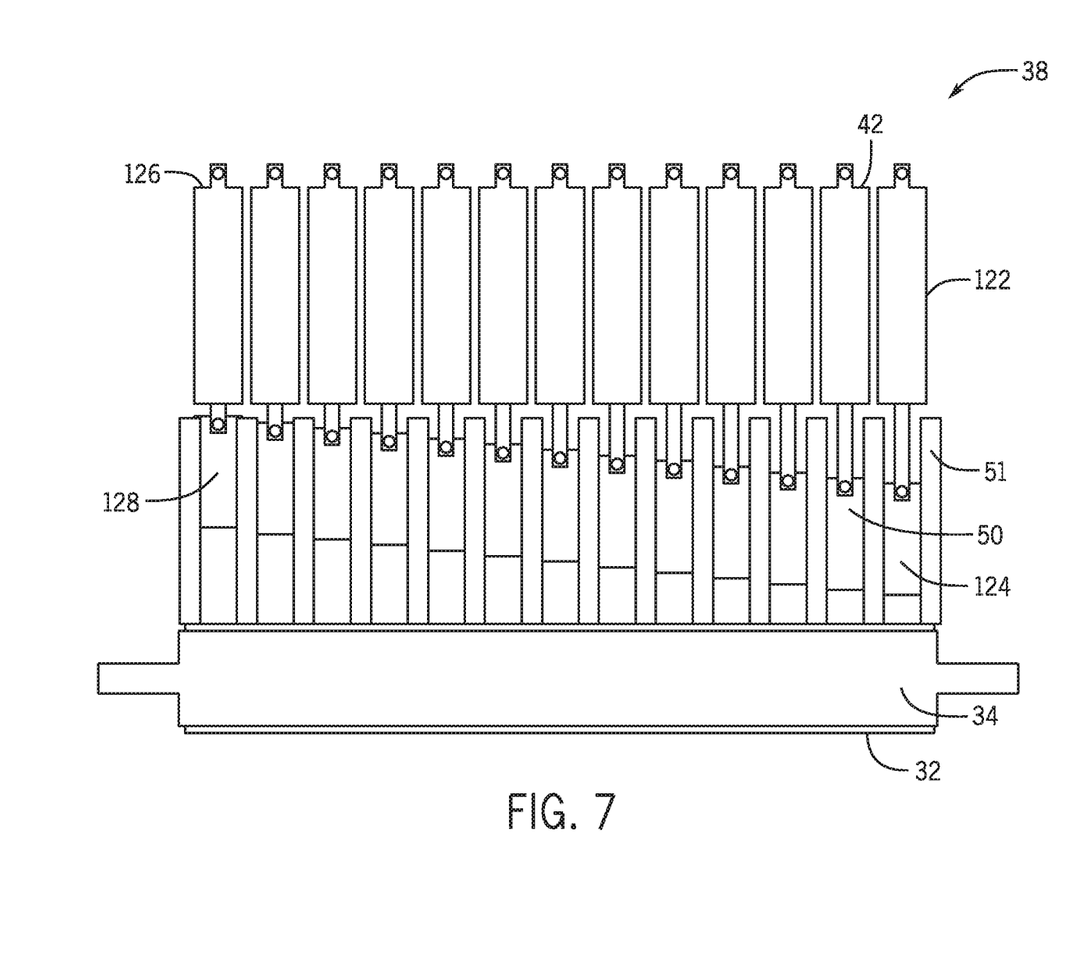
FIG. 7 is a schematic of a front view of the flow control system of FIG. 3, in which the gates of the flow control system are positioned for the agricultural product application equipment to make a right turn, in accordance with an embodiment of the present disclosure.
Figure 8:
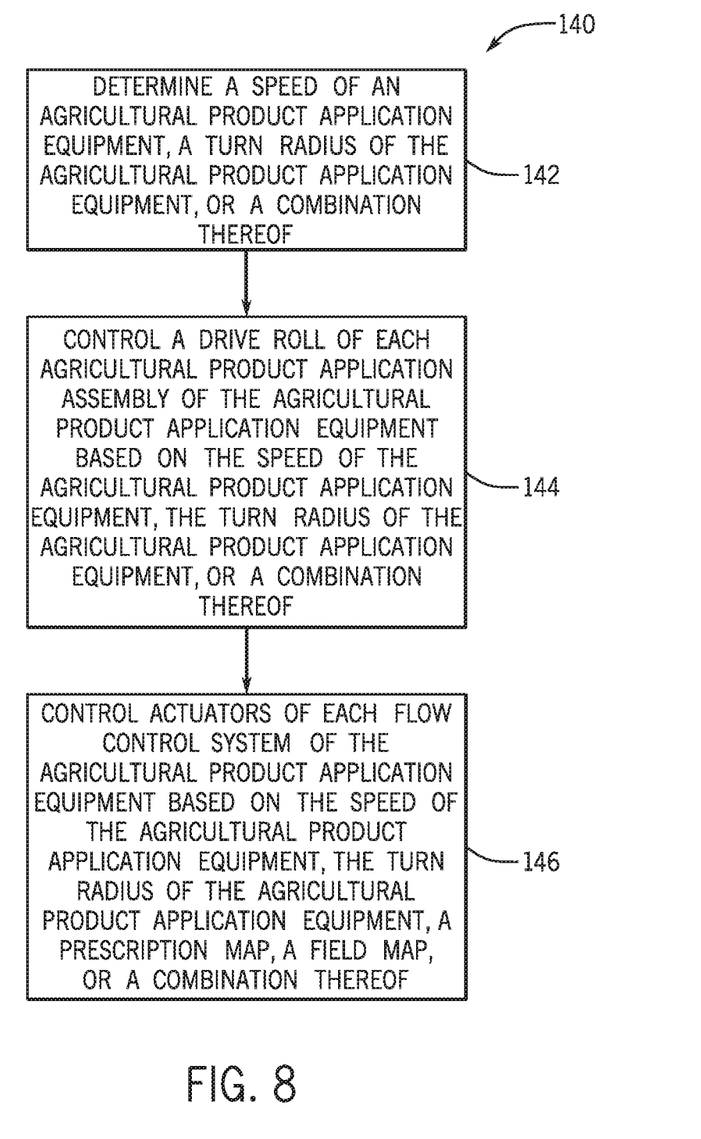
FIG. 8 is a flowchart of a method for controlling the flow control system of FIG. 3, in accordance with an embodiment of the present disclosure.

In some embodiments, a similar result may be achieved by positioning each gate 50 of the right flow control system 38 farther above the belt 32 than each gate 50 of the left flow control system 38. Thus, the nozzles of the right boom may spread more agricultural product than the nozzles of the left boom. In some embodiments, on both booms, each gate 50 to the left of the rightmost gate 124 may be positioned an increment above the previous (immediate right) gate. By way of example, the controller may instruct the leftmost actuator 102 of the left flow control system 38 to position the leftmost gate 104 such that the leftmost gate 104 lets through approximately zero percent of the aggregate agricultural product flow through the gates 50 when the agricultural product application equipment is traveling in an approximately straight line. In addition, the controller may instruct the rightmost actuator 106 of the rightmost gate 108 of the left flow control system 38 such that the rightmost gate 108 lets through approximately 100 percent of the aggregate agricultural product flow through the gates 50 when the agricultural product application equipment is traveling in an approximately straight line. The controller may instruct the leftmost actuator 102 of the right flow control system 38 to position the leftmost gate 104 such that the leftmost gate 104 lets through approximately 100 percent of the aggregate agricultural product flow through the gates 50 when the agricultural product application equipment is traveling in an approximately straight line. In addition, the controller may instruct the rightmost actuator 106 of the rightmost gate 108 of the right flow control system 38 such that the rightmost gate 108 lets through approximately 200 percent of the aggregate agricultural product flow through the gates 50 when the agricultural product application equipment is traveling in an approximately straight line. Controlling the flow to each nozzle may enable the agricultural product application equipment to apply agricultural product approximately evenly onto the ground as the agricultural product application equipment 10 makes the left turn.

In some embodiments, the position of each gate 50 is determined based on a radius of curvature of the turn (e.g., the turning radius of the agricultural product application equipment). In some embodiments, the position of each gate 50 is determined based on the speed of the agricultural product application equipment, the speed of the belt 32, the orientation and/or steering angle of the agricultural product application equipment, or a combination thereof, among other parameters. Instructions, lookup tables, and/or other data related to the position of each gate 38 when making a turn may be stored in the memory device.

FIG. 7 is a schematic front view of the flow control system 38 of FIG. 3, in which the gates 50 of the flow control system are positioned for the agricultural product application equipment to make a right turn, in accordance with an embodiment of the present disclosure. Because the distal end of the right boom of the agricultural product application equipment travels a shorter distance than the proximal end of the right boom, it may be desirable to expel less agricultural product from the nozzle(s) near the distal end of the right boom than from the nozzle(s) near the proximal end of the right boom. As such, the controller may instruct the rightmost actuator 122 to position the rightmost gate 124 closer to the belt 32. The controller may also instruct the leftmost actuator 126 to position the leftmost gate 128 farther from the belt 32. In addition, the controller may instruct the remaining actuators 42 to position each gate in a position between the position of the rightmost gate 124 and the position of the leftmost gate 128. For example, each gate to the left of the rightmost gate 124 may be positioned an increment above the previous (immediate right) gate. For the left boom, it may be similarly desirable to expel less agricultural product from the nozzle (s) near the distal end of the left boom than from the nozzle(s) near the proximal end of the left boom. However, it may also be desirable to expel a greater or approximately equal amount of agricultural product from the nozzle(s) near the distal end of the left boom as compared to the nozzle(s) near the proximal end of the right boom.

In some embodiments, the gates of the left flow control system 38 are positioned in approximately the same positions as the gates of the right flow control system 38. To spread less agricultural product from the corresponding nozzles of the right boom than the left boom, the speed of the drive roll(s) 34 of the right agricultural product application assembly may be less than the speed of the drive roll(s) 34 of the left agricultural product application assembly. In some embodiments, a similar result may be achieved by positioning each gate 50 of the left flow control system 38 farther above the belt 32 than each gate 50 of the right flow control system 38. Controlling the flow to each nozzle may thus enable the agricultural product application equipment to apply agricultural product approximately evenly onto the ground as the agricultural product application equipment 10 makes the right turn.

FIG. 8 is a flowchart of a method 140 for controlling the flow control system of FIG. 3, in accordance with an embodiment of the present disclosure. The controller determines (block 142) a speed and a turn radius of the agricultural product application equipment. In some embodiments, the controller 62 determines the speed and the turn radius of the agricultural product application equipment 10 by receiving information from sensor(s) on the agricultural product application equipment, such as vehicle speed sensor(s), vehicle acceleration sensor(s), vehicle location sensor(s), vehicle orientation sensor(s), vehicle direction sensor(s), vehicle steering sensor(s), or a combination thereof, among other sensor(s). The turn radius of the agricultural product application equipment may be determined based on vehicle orientation, vehicle direction, vehicle steering, or a combination thereof, among other parameters.

The controller then controls (block 144) a drive roll of each agricultural product application assembly of the agricultural product application system of the agricultural product application equipment based on the speed and/or the turn radius of the agricultural product application equipment. In some embodiments, the controller may instruct the drive roll of each flow control system such that, as the agricultural product application equipment accelerates, the controller instructs the drive roll to increase speed. For example, the controller may control the drive roll such that the drive roll maintains a speed that is based on the speed of the agricultural product application equipment. Additionally, the controller may instruct a drive roll to change speed based on the turn radius of the agricultural product application equipment. For example, if the agricultural product application equipment makes a 90 degree left turn, the controller may instruct the drive roll of the left agricultural product application assembly to reduce speed, instruct the drive roll of the right agricultural product application assembly to increase speed, or a combination thereof. As another example, if the agricultural product application equipment makes a 90 degree right turn, the controller may instruct the drive roll of the right agricultural product application assembly to reduce speed, instruct the drive roll of the left agricultural product application assembly to increase speed, or a combination thereof. In some embodiments, a lookup table may be used to determine the speed of the drive roll based on the speed of the agricultural product application equipment and/or the turn radius of the agricultural product application equipment. The lookup table may be stored, for example, in the memory device.

The controller also controls (block 146) actuators of each flow control system of the agricultural product application equipment based on the speed and/or the turn radius of the agricultural product application equipment. For example, when the agricultural product application equipment is traveling in an approximately straight line (i.e., approximately zero turn radius), the controller may instruct the actuators to position the gates (including the gates on the left flow control system and the right flow control system) a substantially equal distance from the belt.

As another example, if the agricultural product application equipment is making a 90 degree left turn, the controller may instruct the leftmost actuator of the left flow control system to position the leftmost gate closer to the belt and the rightmost actuator to position the rightmost gate farther from the belt. In addition, the controller may instruct the remaining actuators to position each gate in a position between the position of the leftmost gate and the position of the rightmost gate. For example, each gate to the right of the leftmost gate may be positioned an increment above the previous (immediate left) gate. In some embodiments, the gates of the right flow control system are positioned in approximately the same positions as the gates of the right flow control system.

In some embodiments, the controller instructs the actuators of the right flow control system to position each corresponding gate farther above the belt than each gate of the left flow control system.

If the agricultural product application equipment is making a 90 degree right turn, the controller may instruct the rightmost actuator of the right flow control system to position the rightmost gate closer to the belt and the leftmost actuator to position the leftmost gate farther from the belt. In addition, the controller may instruct the remaining actuators to position each gate in a position between the position of the rightmost gate and the position of the leftmost gate. For example, each gate to the left of the rightmost gate may be positioned an increment above the previous (immediate right) gate. In some embodiments, the gates of the left flow control system are positioned in approximately the same positions as the gates of the left flow control system. In some embodiments, the controller instructs the actuators of the left flow control system to position each corresponding gate farther above the belt than each gate of the right flow control system. Controlling the flow to each nozzle during a turn may thus enable the agricultural product application equipment to apply agricultural product approximately evenly onto the ground as the agricultural product application equipment makes the turn.

Figure 9:
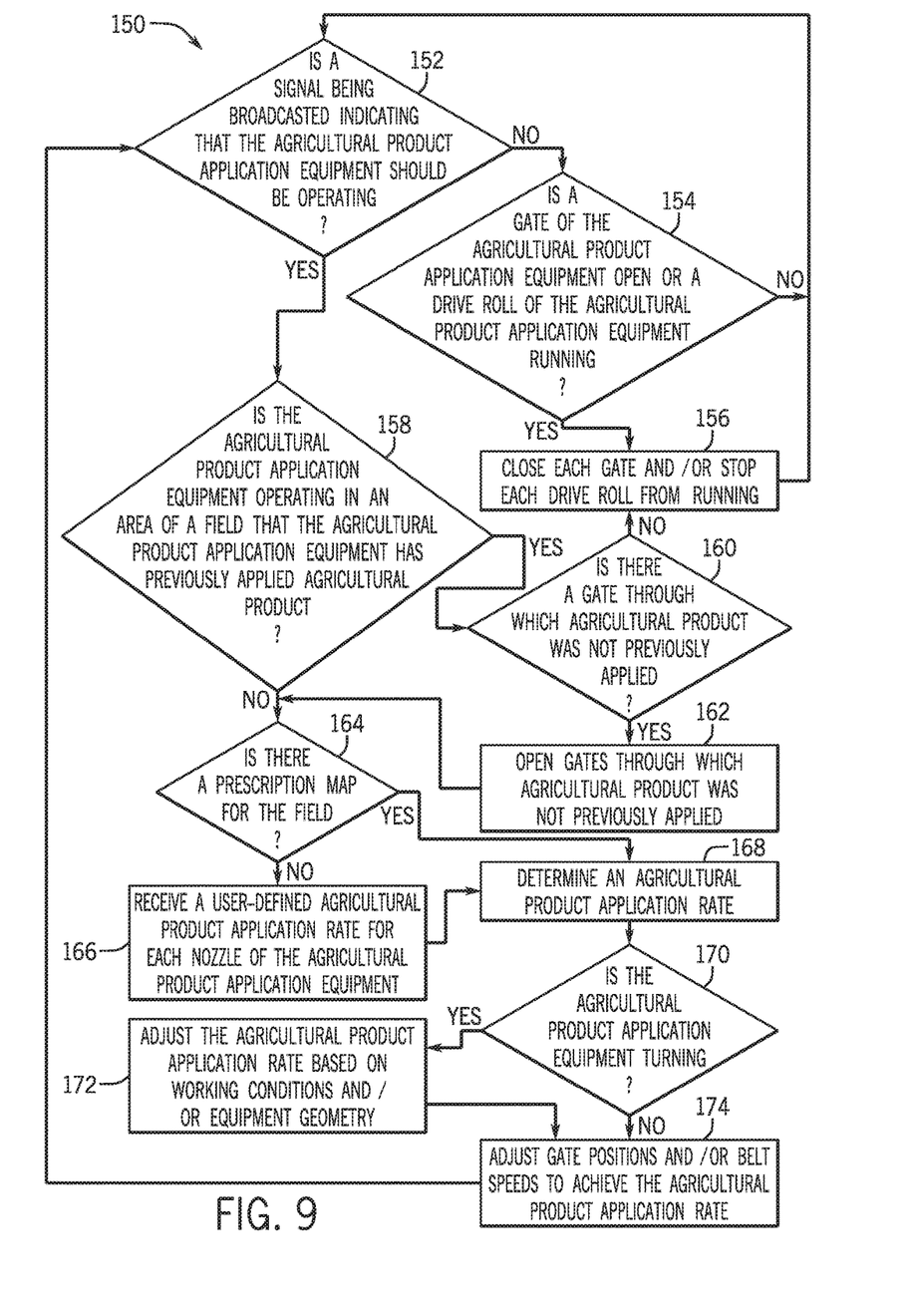
FIG. 9 is a flowchart of a method for applying agricultural product using the agricultural product application equipment of FIG. 4, in accordance with an embodiment of the present disclosure.

FIG. 9 is a flowchart of a method 150 for applying agricultural product using the agricultural product application equipment of FIG. 4, in accordance with an embodiment of the present disclosure. The controller determines (node 152) whether a signal is being broadcasted (e.g., from an agricultural system or a base station) indicating that the agricultural product application equipment should be operating. The controller may receive the signal via the communication device communicatively coupled to the controller. If the controller determines that the signal is not being broadcasted, the controller determines (node 154) whether a gate of the agricultural product application equipment is open or a drive roll of the agricultural product application equipment is running. If not, the method 150 returns to the beginning and starts again with node 152. If the controller does determine that a gate of the agricultural product application equipment is open or a drive roll of the agricultural product application equipment is running, the controller closes (block 156) each gate and/or stops each drive roll from running. In this manner, the controller may ensure that each gate of the agricultural product application equipment is closed and each drive roll of the agricultural product application equipment is not running when the agricultural product application equipment is not operating.

If the controller determines that the signal indicating that the agricultural product application equipment should be operating is being broadcasted, the controller determines (node 158) whether the agricultural product application equipment is operating in an area of the field that the agricultural product application equipment has previously applied agricultural product. This determination may be based at least in part on a sensor (e.g., via a GPS receiver, GPS antenna, DGPS receiver, DGPS antenna, or other location determination technique device) of the agricultural product application equipment providing a location of the agricultural product application equipment. For example, the memory device of the controller may store locations provided by a GPS receiver at which the agricultural product application equipment has previously applied agricultural product. If the controller determines that the agricultural product application equipment is operating in an area of the field that the agricultural product application equipment has previously applied agricultural product, the controller determines (node 160) whether there is a gate of the agricultural product application equipment through which the agricultural product was not previously applied. If not, the method 150 proceeds to block 156. If the controller determines that there is a gate of the agricultural product application equipment through which the agricultural product was not previously applied, the controller opens (block 162) the gates through which the agricultural product was not previously applied. The method then proceeds to node 164.

Likewise, if the controller determined that the agricultural product application equipment is not operating in the area of the field that the agricultural product application equipment has previously applied agricultural product, the method also proceeds to node 164. The controller determines (node 164) whether there is a prescription map for the field. In particular, the controller may determine whether the prescription map is saved in the memory device of the controller or whether the prescription map may be received using the communication device of the agricultural product application equipment. If the controller determines that there is not a prescription map, the controller receives (block 166) a user-defined agricultural product application rate for each nozzle of the agricultural product application equipment. For example, the user-defined agricultural product application rates may be provided by a user via the input device of the user-defined agricultural product application rate. The method then proceeds to block 168. Likewise, if the controller determined that there is a prescription map, the method also proceeds to block 168.

The controller then determines (block 168) an agricultural product application rate (e.g., for each nozzle of the agricultural product application equipment). The agricultural product application rate may be determined at least in part on the prescription map or the user-defined agricultural product application rates. In some embodiments, the agricultural product application rate may be determined using the ISOBus Class 3 CAN bus protocol. The controlled then determines (node 170) if the agricultural product application equipment is turning. If so, the controller adjusts (block 172) the agricultural product application rate (e.g., for each nozzle of the agricultural product application equipment) based on any combination of working conditions and equipment geometry. For example, the controller may adjust the agricultural product application rate based on the speed and/or the turn radius of the agricultural product application equipment. The controller may then adjust (block 174) gate positions and/or drive belt speeds to achieve the agricultural product application rate (e.g., for each nozzle of the agricultural product application equipment). The method 150 then restarts by proceeding to node 152. The method 150 may be used thusly to operate the agricultural product application equipment to apply agricultural product approximately evenly onto the field, including when the agricultural product application equipment makes turns.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural product application system for an agricultural vehicle, comprising:
    a belt configured to convey agricultural product;
    a drive roll configured to drive the belt;
    a flow control system configured to receive the agricultural product from the belt, wherein the flow control system comprises a plurality of gates and a plurality of actuators, each gate of the plurality of gates is configured to control a respective flow of the agricultural product to at least one respective output of the agricultural product application system based at least in part on a position of the gate relative to the belt, and each actuator of the plurality of actuators is coupled to at least one respective gate of the plurality of gates to control the position of the at least one respective gate relative to the belt; and
    a controller communicatively coupled to the plurality of actuators, wherein the controller is configured to instruct each actuator of the plurality of actuators to control the position of the at least one respective gate relative to the belt based at least in part on a speed of the agricultural vehicle, a turning radius of the agricultural vehicle, a prescription map, a field map, or a combination thereof,
    wherein the plurality of gates comprises at least three gates, the plurality of actuators comprises at least three actuators, a first gate of the at least three gates is disposed between a second gate of the at least three gates and a third gate of the at least three gates, and the controller is configured to instruct the at least three actuators to position the first gate at an intermediate distance above the belt relative to the second gate and the third gate and position the second gate above the third gate.

2. The agricultural product application system of claim 1, wherein the controller is communicatively coupled to the drive roll and configured to control a speed of the belt based at least in part on the speed of the agricultural vehicle, the turning radius of the agricultural vehicle, or a combination thereof.

3. The agricultural product application system of claim 1, comprising a divider disposed between a pair of gates of the plurality of gates, wherein the divider is configured to separate respective flows of the agricultural product.

4. The agricultural product application system of claim 3, wherein the divider is positioned upstream of the pair of gates, downstream of the pair of gates, or a combination thereof, relative to a direction of the respective flows of the agricultural product.

5. The agricultural product application system of claim 1, wherein the flow control system comprises at least one gate guide, and each gate of the plurality of gates is supported by the at least one gate guide.

6. The agricultural product application system of claim 5, wherein the at least one gate guide is configured to stabilize each gate of the plurality of gates in contact with the at least one gate guide throughout a range of motion.

7. The agricultural product application system of claim 1, wherein a gate of the plurality of gates is configured to be positioned at an intermediate distance above the belt between a fully open position and a fully closed position.

8. An agricultural product application vehicle, comprising:
- a left boom and a right boom;
- an agricultural product application system comprising a first plurality of outputs coupled to the left boom, a second plurality of outputs coupled to the right boom, a left agricultural product application assembly, and a right agricultural product application assembly, wherein each output of the first and second plurality of outputs is configured to spread agricultural product onto a soil surface, the left agricultural product application assembly is configured to distribute the agricultural product to the first plurality of outputs, the right agricultural product application assembly is configured to distribute the agricultural product to the second plurality of outputs, and the left agricultural product application assembly and the right agricultural product assembly each comprises:
  - a belt configured to convey the agricultural product;
  - a drive roll configured to drive the belt;
  - a flow control system, comprising a plurality of gates and a plurality of actuators, wherein each gate of the plurality of gates is configured to control a respective flow of the agricultural product to at least one respective output of a respective plurality of outputs based at least in part on a position of the gate relative to the belt, and each actuator of the plurality of actuators is coupled to at least one respective gate of the plurality of gates to control the position of the at least one respective gate relative to the belt; and
- a controller communicatively coupled to the plurality of actuators of the left agricultural product application assembly, to the drive roll of the left agricultural product application assembly, to the plurality of actuators of the right agricultural product application assembly; and to the drive roll of the right agricultural product application assembly;
- wherein the controller is configured to:
  - instruct each actuator of the plurality of actuators of the left agricultural product application assembly to control the position of the at least one respective gate relative to the belt of the left agricultural product application assembly based at least in part on a speed of the agricultural product application vehicle, a turning radius of the agricultural product application vehicle, a prescription map, a field map, or a combination thereof; and
  - instruct each actuator of the plurality of actuators of the right agricultural product application assembly to control the position of the at least one respective gate relative to the belt of the right agricultural product application assembly based at least in part on the speed of the agricultural product application vehicle, the turning radius of the agricultural product application vehicle, the prescription map, the field map, or the combination thereof; and
  - wherein the controller instructs the drive roll of the left agricultural product application assembly, the drive roll of the right agricultural product application assembly, or a combination thereof, to change speed based at least in part on the turning radius of the agricultural product application vehicle.

9. The agricultural product application vehicle of claim 8, comprising a vehicle speed sensor communicatively coupled to the controller and configured to output a signal indicative of the speed of the agricultural product application vehicle.

10. The agricultural product application vehicle of claim 8, comprising a vehicle orientation sensor communicatively coupled to the controller and configured to output a first signal indicative of an orientation of the agricultural product application vehicle, a spatial locating device communicatively coupled to the controller and configured to output a second signal indicative of a position of the agricultural product application vehicle, a vehicle steering sensor communicatively coupled to the controller and configured to output a third signal indicative of a steering angle of the agricultural product application vehicle, or a combination thereof, wherein the controller is configured to determine the turning radius based at least in part on the first signal, the second signal, the third signal, or a combination thereof.

11. The agricultural product application vehicle of claim 8, wherein the plurality of gates of the flow control system of the left agricultural product application assembly comprises at least three gates, the plurality of actuators of the flow control system of the left agricultural product application assembly comprises at least three actuators, a first gate of the at least three gates is disposed between a second gate of the at least three gates and a third gate of the at least three gates, and the controller is configured to instruct the at least three actuators to position the first gate at an intermediate distance above the belt relative to the second gate and the third gate, and to position the second gate above the third gate.

12. The agricultural product application vehicle of claim 8, wherein the plurality of gates of the flow control system of the right agricultural product application assembly comprises at least three gates, the plurality of actuators of the flow control system of the right agricultural product application assembly comprises at least three actuators, a first gate of the at least three gates is disposed between a second gate of the at least three gates and a third gate of the at least three gates, and the controller is configured to instruct the at least three actuators to position the first gate at an intermediate distance above the belt relative to the second gate and the third gate, and to position the second gate above the third gate.

13. The agricultural product application vehicle of claim 8, wherein a gate of the plurality of gates is configured to be positioned at an intermediate distance above the belt of the left agricultural product application assembly or the belt of the right agricultural product application assembly between a fully open position and a fully closed position.

14. A method for controlling an agricultural product application system of an agricultural product application vehicle, comprising:
- determining, via a processor, a speed of the agricultural product application vehicle, a turn radius of the agricultural product application vehicle, or a combination thereof; and
- controlling, via the processor, a first set of actuators of a first flow control system of a first agricultural product application assembly, a second set of actuators of a second flow control system of a second agricultural product application assembly, or a combination thereof, based at least in part on the speed of the agricultural product application vehicle, the turn radius of the agricultural product application vehicle, a prescription map, a field map, or a combination thereof, wherein:
  - the first set of actuators is coupled to a first set of gates of the first flow control system and controls positions of respective gates of the first set of gates relative to a first belt of the first agricultural product application assembly; and the second set of actuators is coupled to a second set of gates of the second flow control system and controls positions of respective gates of the second set of gates relative to a second belt of the second agricultural product application assembly, wherein controlling, via the processor, the first set of actuators, the second set of actuators, or the combination thereof, comprises positioning each gate of the first set of gates a distance above the first belt equal to a distance of each gate of the second set of gates above the second belt when the agricultural product application vehicle is traveling in a straight line.

15. The method of claim 14, comprising controlling, via the processor, a first drive roll of the first agricultural product application assembly of the agricultural product application system, a second drive roll of the second agricultural product application assembly of the agricultural product application system, or a combination thereof, based at least in part on the speed of the agricultural product application vehicle, the turn radius of the agricultural product application vehicle, or a combination thereof.

16. The method of claim 15, wherein controlling, via the processor, the first drive roll, the second drive roll, or the combination thereof, comprises instructing the first drive roll to rotate at a speed equal to a speed of the second drive roll when the agricultural product application vehicle is traveling in a straight line.

17. The method of claim 15, wherein controlling, via the processor, the first drive roll, the second drive roll, or the combination thereof, comprises changing a speed of the first drive roll, a speed of the second drive roll, or a combination thereof, when the agricultural product application vehicle is turning.

18. The method of claim 14, wherein the first set of actuators comprises at least three actuators, the first set of gates comprises at least three gates, a first gate of the at least three gates is disposed between a second gate of the at least three gates and a third gate of the at least three gates, and controlling, via the processor, the first set of actuators, the second set of actuators, or the combination thereof, comprises instructing the at least three actuators to position the first gate at an intermediate distance above the first belt relative to the second gate and the third gate, and to position the second gate above the third gate.

19. The method of claim 14, wherein the second set of actuators comprises at least three actuators, the second set of gates comprises at least three gates, a first gate of the at least three gates is disposed between a second gate of the at least three gates and a third gate of the at least three gates, and controlling, via the processor, the first set of actuators, the second set of actuators, or the combination thereof, comprises instructing the at least three actuators of the second flow control system to position the first gate at an intermediate distance above the second belt relative to the second gate and the third gate, and to position the second gate above the third gate.

20. The method of claim 14, wherein a first gate of the first set of gates is configured to be positioned at an intermediate distance above the first belt between a fully open position and a fully closed position, and wherein a second gate of the second set of gates is configured to be positioned at an intermediate distance above the second belt between a fully open position and a fully closed position.

* * * * *